United States Patent
Yoshida et al.

[11] Patent Number: 5,831,787
[45] Date of Patent: Nov. 3, 1998

[54] HEAD POSITION DEMODULATING METHOD

[75] Inventors: Susumu Yoshida; Shuichi Hashimoto, both of Kawasaki, Japan

[73] Assignee: Fujitsu Limited, Kawasaki, Japan

[21] Appl. No.: 714,408

[22] Filed: Sep. 13, 1996

[30] Foreign Application Priority Data

Dec. 28, 1995 [JP] Japan .................................. 7-343465

[51] Int. Cl.$^6$ .................................................. G11B 21/10
[52] U.S. Cl. ..................................... 360/78.09; 360/78.14
[58] Field of Search ............................ 360/78.08, 78.09, 360/78.14, 77.05, 77.11, 78.04

[56] References Cited

U.S. PATENT DOCUMENTS

| | | | |
|---|---|---|---|
| 5,132,854 | 7/1992 | Tsuyoshi et al. | 360/78.14 |
| 5,151,639 | 9/1992 | Hasegawa et al. | 360/78.09 |
| 5,576,909 | 11/1996 | Dierkes et al. | 360/78.09 |
| 5,694,265 | 12/1997 | Kosugi et al. | 360/77.05 |

FOREIGN PATENT DOCUMENTS 62-43618  9/1994  Japan .
8106742  4/1996  Japan .

*Primary Examiner*—Thang V. Tran
*Attorney, Agent, or Firm*—Greer, Burns & Crain, Ltd.

[57] ABSTRACT

A method of demodulating head position in a disk apparatus in which a head is moved toward a target cylinder using a position detection signal that has been recorded on a disk medium. This method includes the steps of: predicting, at a current sampling point, the position of the head at the next sampling point; moving the head by instructing a current for a motor based upon the predicted position; obtaining a position deviation which indicates deviation from the predicted position to the head position at the next sampling point by reading the position detection signal that has been recorded on the disk medium; demodulating the head position at the next sampling point using the position deviation signal and the predicted position; predicting position of the head at an immediately following sampling point using a value obtained by outputting the difference (traveling velocity) between predicted positions at neighboring sampling points via a first-order low-pass filter, the predicted position, a difference between the predicted position and the head position and the value of the current instructed for the motor, and instructing a current for the motor based upon the predicted position.

9 Claims, 16 Drawing Sheets

FIG. 12

| CYLINDER TYPE | EVEN 1.2 | ODD |
|---|---|---|
| CYL0 | PLL-CK4-D2 | PLL-CK4-D2 |
| CYL1 | PLL-CK4-D3 | PLL-CK4-D1 |
| CYL2 | PLL-CK4-D0 | PLL-CK4-D0 |
| CYL3 | PLL-CK4-D1 | PLL-CK4-D3 |

HEAD POSITION DEMODULATING METHOD

BACKGROUND OF THE INVENTION

This invention relates to a method of demodulating the position of a head in a magnetic disk apparatus or the like. More particularly, the invention relates to a position demodulating method in which a signal for position detection is recorded on a disk medium in advance. The position of a head is demodulated using the position detection signal and, the position at the next sampling point is predicted. A current passed through a motor is instructed based upon the predicted position, and the head is moved toward a target cylinder.

Performing recording at higher densities is essential for the purpose of increasing the recording capacity of a magnetic disk apparatus and reducing the size of the apparatus. In terms of higher speed, the performance of the apparatus must be such that head seek time is on the order of 10 ms. With digitization of the positioning circuitry, the circuit for detecting the position of a servo head need only be capable of detecting position at the sampling timing of a digital servo circuit, and the detecting circuit differs from an analog servo circuit for detecting position.

FIG. 16 is a block diagram illustrating the general architecture of a digital servo circuit. The circuit includes a spindle motor 1 and magnetic disks 2 and 3 rotated by the spindle motor 1. User information is recorded on the magnetic disk 2 and only a signal for the purpose of position detection is recorded on the disk surface of magnetic disk 3. Though only a single magnetic disk 2 is shown, usually a number of these information recording disks are provided. It should be noted that the magnetic disk 3 for position detection can be deleted by recording the user information on one side of the magnetic disk 2 and recording the position detection signal on the other side.

The circuit further includes a voice coil motor (VCM) 4 for moving a magnetic head in the radial direction, a magnetic head 5 for reading data from or writing data to the information recording disk 2, a magnetic head (servo head) 6 for reading the position detection signal from the magnetic disk (servo disk) 3, an AGC circuit for obtaining a constant signal level for the signal read by the servo head 6, a position demodulating circuit 8 for demodulating a position deviation signal p(n) based upon the position detection signal read by the servo head 6, an AD converter 9 for converting the analog position deviation signal p(n) to a digital signal, a DSP (digital signal processor) 10 for executing servo control processing based upon the position deviation signal p(n) and outputting a current command value I(n) for driving the VCM 4, a DA converter 11 for converting the digital current value to an analog value, and a VCM drive circuit 12.

The cylinders of a disk are of various types for every n-number of cylinders. For example, as shown in FIG. 17, there are four cylinder types (CYL0, CYL1, CYL2, CYL3) every four cylinders.

In a digital servo circuit of this kind, the DSP 10 demodulates the head position using the position deviation signal p(n) (=A·posadc(n)) that has entered from the position demodulating circuit 8 via the AD converter 9, predicts the head position at the next sampling point, instructs the current to be passed through the motor based upon the predicted position and positions the head at the target cylinder.

More specifically, the DSP 10 obtains the cylinder type clt(n) of the cylinder to which the predicted head position estpos(n−1) of the current sampling point t(n) belongs, and enters this signal into the position demodulating circuit 8. The position demodulating circuit 8 obtains a position deviation p(n), which is the deviation from the center of the cylinder of the above-mentioned cylinder type to the head, by reading the position detection signal that has been recorded on the servo disk, converting the deviation from an analog to a digital quantity and entering the digital quantity into the DSP 10. The DSP 10 adds the position deviation signal p(n) and the integral part of the predicted position estpos(n−1) and demodulates the head position pos(n). Further, the DSP 10 obtains the difference between head positions pos(n) and pos(n−1) at the current sampling point t(n) and immediately preceding sampling point (t−1), respectively, as traveling velocity v(n), adds the head position pos(n) at the current sampling point t(n) and the velocity v(n) and predicts the head position estpos(n) at the next sampling point t(n+1). Next, the DSP 10 obtains the cylinder type clt(n+1) of the cylinder to which the predicted position estpos(n) belongs, enters this signal into the position demodulating circuit 8, instructs a current I(n) for the voice coil motor VCM based upon the predicted position estpos(n) and moves the head to the target cylinder. The current value I(n) instructed for the motor is decided based upon the traveling velocity v(n) and predicted position data estpos(n) until the target cylinder is attained. After the target cylinder has been reached, the current I(n) instructed for the motor is decided based upon the predicted position data estpos(n).

The DSP processing will be expressed below in the form of equations. The position information on the servo side is sampled discretely and both position and velocity are calculated for every sample.

$$p(n) = A \cdot \text{posadc}(n) \tag{1}$$

$$\text{pos}(n) = \text{INT}[\text{estpos}(n-1)+0.5]+p(n) \tag{2}$$

$$v(n) = \text{pos}(n) - \text{pos}(n-1) \tag{3}$$

$$\text{estpos}(n) = \text{pos}(n) + v(n) \tag{4}$$

$$\text{clt}(n+1) = \text{INT}[\text{estpos}(n)+0.5] \text{ AND } 3(\text{cyl}) \tag{5}$$

Here posadc(n), which is accompanied by a sign, indicates how much the head is currently offset from the center of a cylinder of type CYLi, where CYLi represents the cylinder type of the target cylinder. The signal posadc(n) is the output signal of the AD converter 9. The units in which the value from the AD converter 9 is expressed depend upon the position demodulating circuit 8.

Further, p(n) is position deviation which is the offset from the center of the cylinder of target cylinder type to the head position at the current sampling point t(n). Next, A is a constant for converting the value posadc(n) from the AD converter 9 to the position deviation p(n), pos(n) is the actual position of the head, which is obtained by adding the position deviation p(n) to the integral part of the head position [predicted position estpos(n−1)] at the current sampling position t(n) predicted at the previous sampling position t(n−1), and INT represents an integer. The reason for adding on 0.5 is that the position in a cylinder is expressed by a value in a range which is ±0.5 cylinders.

Further, v(n) represents the traveling velocity of the head at the current sampling point. The difference (position differential) between the actual head position pos(n) at the current sampling point t(n) and the head position pos(n−1) at the previous sampling point t(n−1) is obtained and is adopted as the velocity at the current sampling point.

Next, estpos(n) is a value obtained by predicting the head position at the next sampling point t(n+1) from the head position pos(n) and velocity v(n) at the current sampling point t(n).

Finally, clt(n+1) is the cylinder type of a cylinder to which the predicted head position estpos(n) at the sampling point t(n+1) belongs. The 0.5 is added on to discriminate a range of 0.5 cylinder on either side of a cylinder. The position deviation signal indicating deviation of the head from the center of a cylinder to which the predicted position estpos(n) belongs, is demodulated by the demodulating circuit 8 based upon the cylinder type clt(n+1).

When head position is calculated in this digital system, actual head position and predicted head position coincide at each sampling point and positioning of the head can be performed correctly, as shown in FIG. 18A, where the black circles indicate actual position and the white circuits indicate predicted position. In FIG. 18A, HTR represents the path of head movement.

When the medium of the servo surface is scratched or flawed, however, the position deviation signal p(n) or the signal posadc(n) obtained from the AD converter 9 becomes abnormal. When this occurs, the head position pos(n) and the velocity v(n) calculated from Equations (2) and (3) at the current sampling point t(n) take on values different from the actual head position and actual velocity, as illustrated in FIG. 18B. Prediction of the position estpos(n) at the next sampling point t(n+1) is performed using abnormal values obtained from Equations (2) and (3) in Equation (4). As a consequence, when the correct position deviation signal p(n+1) is obtained at the next sampling point t(n+1), the predicted position estpos(n) and the head position pos(n+1) deviate from each other by a wide margin. In other words, the location at which the head is actually situated becomes one far removed from the predicted position estpos(n) predicted at the sampling point t(n).

Usually the arrangement is such that the cylinder type repeats every few cylinders. For example, in a cylinder-type arrangement that repeats every four cylinders, a prediction error of within ±2 cylinders from the set cylinder type clt(n+1) is allowed (though this becomes narrower during seek). However, when the above-described abnormality occurs owing to scratching or flawing, situations arise in which the prediction error exceeds ±2 cylinders and the cylinder position develops an error of four-cylinder units. This phenomenon arises not only as the result of scratches and flaws but also as the result of head carriage vibration.

SUMMARY OF THE INVENTION

An object of the present invention is to provide a head-position demodulating method through which it is possible to prevent an erroneous prediction caused by scratches or flaws on the surface of the recording medium, thereby enabling more accurate head positioning.

In accordance with the present invention, the foregoing object is attained by providing a method of demodulating head position in a disk apparatus in which a position detection signal has been recorded on a disk medium. The position detection signal is sampled and a head is moved toward a target cylinder using the position detection signal sampled. The head position demodulating method includes the steps of predicting, at a current sampling point, the position of the head at the next sampling point; moving the head by instructing a current for a motor based upon the predicted position; obtaining a position deviation which indicates deviation from the predicted position to the head position; at the next sampling point by reading the position detection signal that has been recorded on the disk medium; demodulating the head position at the next sampling point using the position deviation signal and the predicted position; adopting a difference between predicted positions at neighboring sampling points as traveling velocity; and predicting the position of the head at an immediately following sampling point using a value obtained by outputting the traveling velocity via a first-order low-pass filter, the predicted position (a difference or prediction error between the predicted position and the head position) and a value of the current instructed for the motor; and instructing a current for the motor based upon the predicted position.

Other features and advantages of the present invention will be apparent from the following description taken in conjunction with the accompanying drawings.

BRIEF DESCRIPTION OF THE DRAWINGS

FIG. 12 is a diagram for describing the relationship between cylinders and a master clock;

DESCRIPTION OF THE PREFERRED EMBODIMENT (A) Overview of the invention

Figure 1:
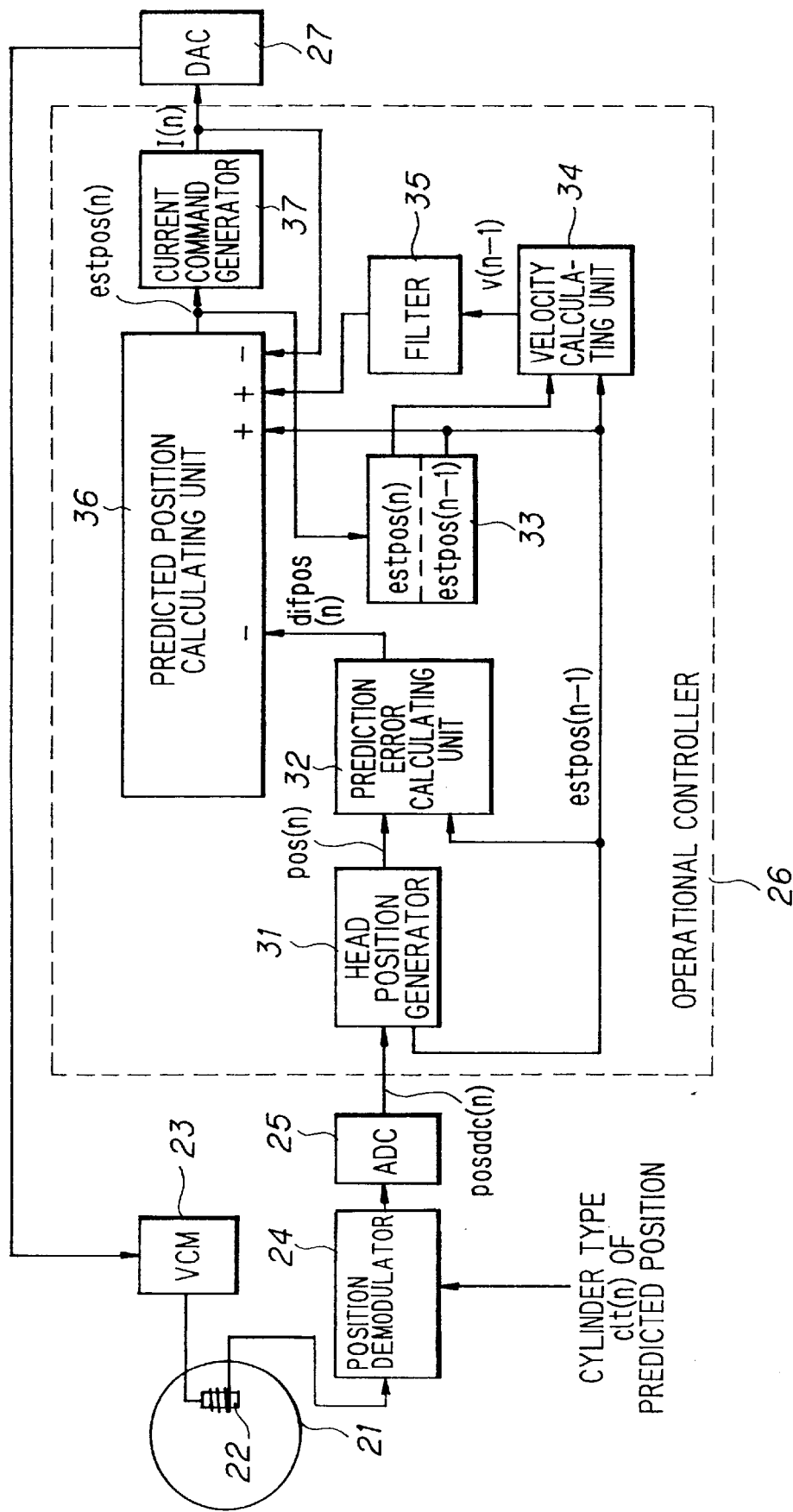
FIG. 1 is a block diagram illustrating the principle of the present invention.

FIG. 1 is a block diagram illustrating an overview of the invention. The apparatus includes a disk medium (servo disk) 21 on which position detection marks have been recorded, a servo head 22, a voice coil motor (VCM) 23 for moving the servo head 22 in the radial direction, a position demodulating unit 24 for demodulating a position deviation signal based upon a position detection mark read by the servo head, an AD converter 25 for converting the position deviation signal to a digital value posadc(n), an operational controller 26 for demodulating head position based upon the position deviation signal and outputting a current command I(n) for driving the VCM 23 by executing servo control processing, and a DA converter 27 for converting the digital current command value I(n) to an analog quantity.

Figure 17:
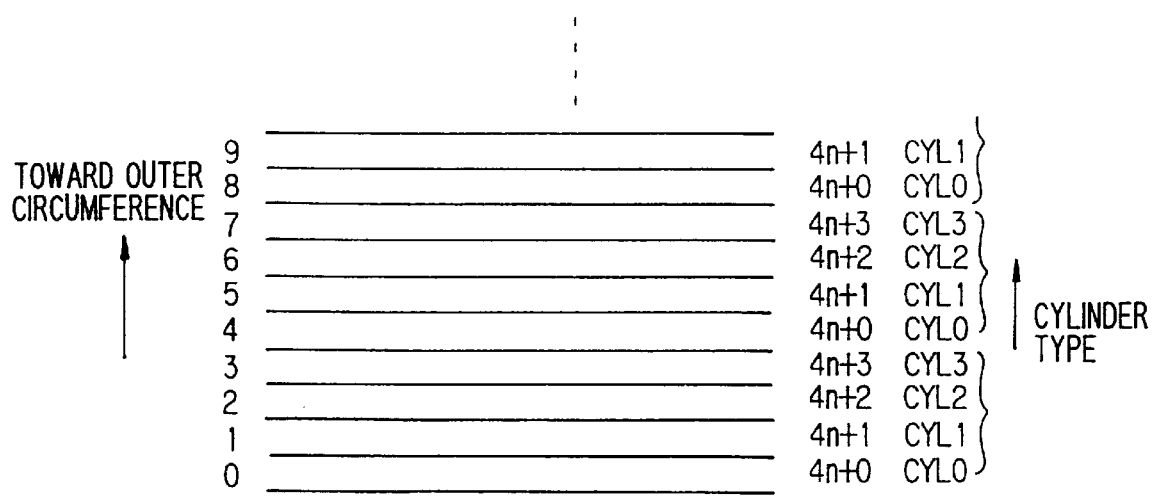
FIG. 17 is a diagram for describing cylinder types.
Figure 18A:
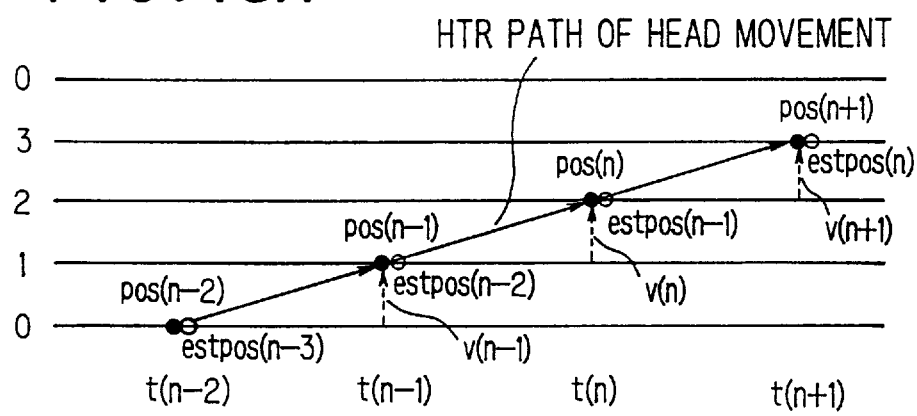
FIGS. 18A, 18B are diagrams for describing the problems encountered in the prior art.
Figure 18B:
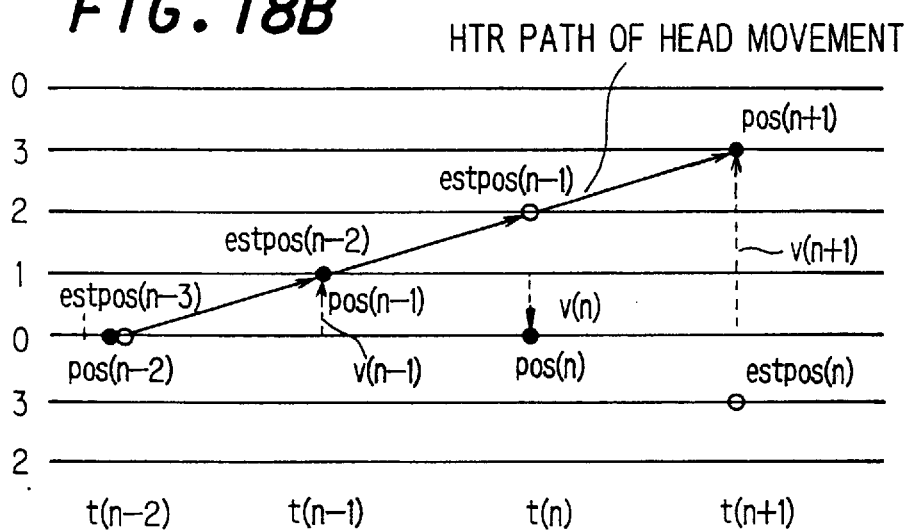

The cylinders of a magnetic disk apparatus are successively assigned n types (four in this example) of different cylinder types CYL0~CYL3 (see FIG. 17). The n types of cylinder types are assigned in similar fashion every n cylinders. Upon being provided with the signal representing the position detection mark read from the disk and the cylinder type clt(n) of the cylinder to which the predicted head position belongs, the position demodulator 24 uses these signals to output a position deviation signal, which corresponds to the deviation from the center of the cylinder of this cylinder type to the head, and the AD converter 25 converts this analog position deviation signal to a digital signal.

The operational controller 26 includes a head position generator 31 for demodulating head position pos(n) at sampling time t(n) using the head position (predicted position) estpos(n−1), predicted at sampling time t(n−1), at the next sampling time t(n), as well as the output posadc(n) of the AD converter 25, a predicted error calculating unit 32 for calculating the difference between the head position pos(n) and the predicted position estpos(n−1) and outputting the result as a prediction error difpos(n), a predicted position memory 33 for storing the predicted positions estpos(n−1), estpos(n) predicted at times t(n−1), t(n), respectively, a velocity calculating unit 34 for calculating and storing, as traveling velocity v(n), the difference between the predicted positions estpos(n−1), estpos(n) predicted at times t(n−1), t(n), respectively, and outputting v(n−1) at the previous sampling time, a first-order low-pass filter 35 for diminishing sudden changes in velocity, a predicted position calculating unit 36 for predicting and outputting the head position estpos(n) at the next sampling time t(n+1) using the predicted position estpos(n−1) at the sampling time t(n−1), a value obtained by outputting the head traveling velocity v(n−1) via the first-order low-pass filter 35, the difference (prediction error) difpos(n) between the predicted position estpos(n−1) and the head position pos(n) and a value I(n−1) of current instructed for the motor, and a current command generator 37 for generating a command current I(n) applied to the motor.

The velocity calculating unit 34 obtains and stores, as the traveling velocity v(n) at the current sampling time t(n), the difference between the predicted positions at the sampling times t(n), t(n−1) and enters the traveling velocity v(n−1), which was obtained at the previous sampling time t(n−1), into the low-pass filter 35. The predicted position calculating unit 36 predicts the head position estpos(n) of the next sampling time t(n+1) using the predicted position estpos(n−1) at sampling time t(n−1), the value obtained by outputting the velocity v(n−1) via the low-pass filter 35, the prediction error difpos(n) and the value I(n−1) of the current instructed for the motor. The current command generator 37 instructs the current I(n) of the motor based upon the predicted position estpos(n) and moves the head to the target cylinder.

Thus, as set forth above, the output of the first-order low-pass filter, namely the head traveling velocity v(n−1), is added to the predicted position estpos(n−1), at the current sampling time t(n), predicted at the sampling time t(n−1), whereby the head position at the next sampling time is predicted, and the predicted position estpos(n) is corrected based upon the prediction error D·difpos(n) at the current sampling time t(n). As a result, even if the surface of the medium is flawed, the predicted position at the next sampling time t(n+1) will not significantly deviate from the head position and the head can be positioned at the target cylinder correctly. Further, since the predicted position is calculated using the velocity v(n−1) obtained from the low-pass filter, sudden changes in the frequency of the velocity signal can be diminished and positioning of the head can be performed in stable fashion. Furthermore, the predicted position estpos(n) is corrected by the instructed current I(n−1) of the motor. Accordingly, even if the calculated velocity v(n) develops a phase lag relative to the intrinsic velocity of the head, the phase lag can be corrected.

The control described above can be applied to seek control, which is for moving the head from the current position to the target cylinder, and to control for positioning after the head has reached the target cylinder (i.e., after the head has been placed on track). The current command generator 37 decides the current value instructed for the motor based upon the traveling velocity v(n) and predicted position estpos(n) until the head arrives at the target cylinder. After the head has arrived at the target cylinder, the current command generator 37 decides the current value instructed for the motor based upon the predicted position data estpos(n). This is position control after attainment of the on-track state. In this case, when position control after attainment of the on-track state is carried out, computation speed can be raised by regarding the current value I(n−1) as being zero and calculating the predicted position estpos(n).

The control described above can be applied to both a servo-surface servo system, in which use is made of a special-purpose servo disk on which only information for detecting the head has been recorded, and a sector servo (data-surface servo) system, in which the track on a disk is divided into a plurality of sectors, information for detecting the head position is written at a predetermined position of each sector and data are written at the remaining portion of each sector.

(B) Overall architecture

Figure 2:
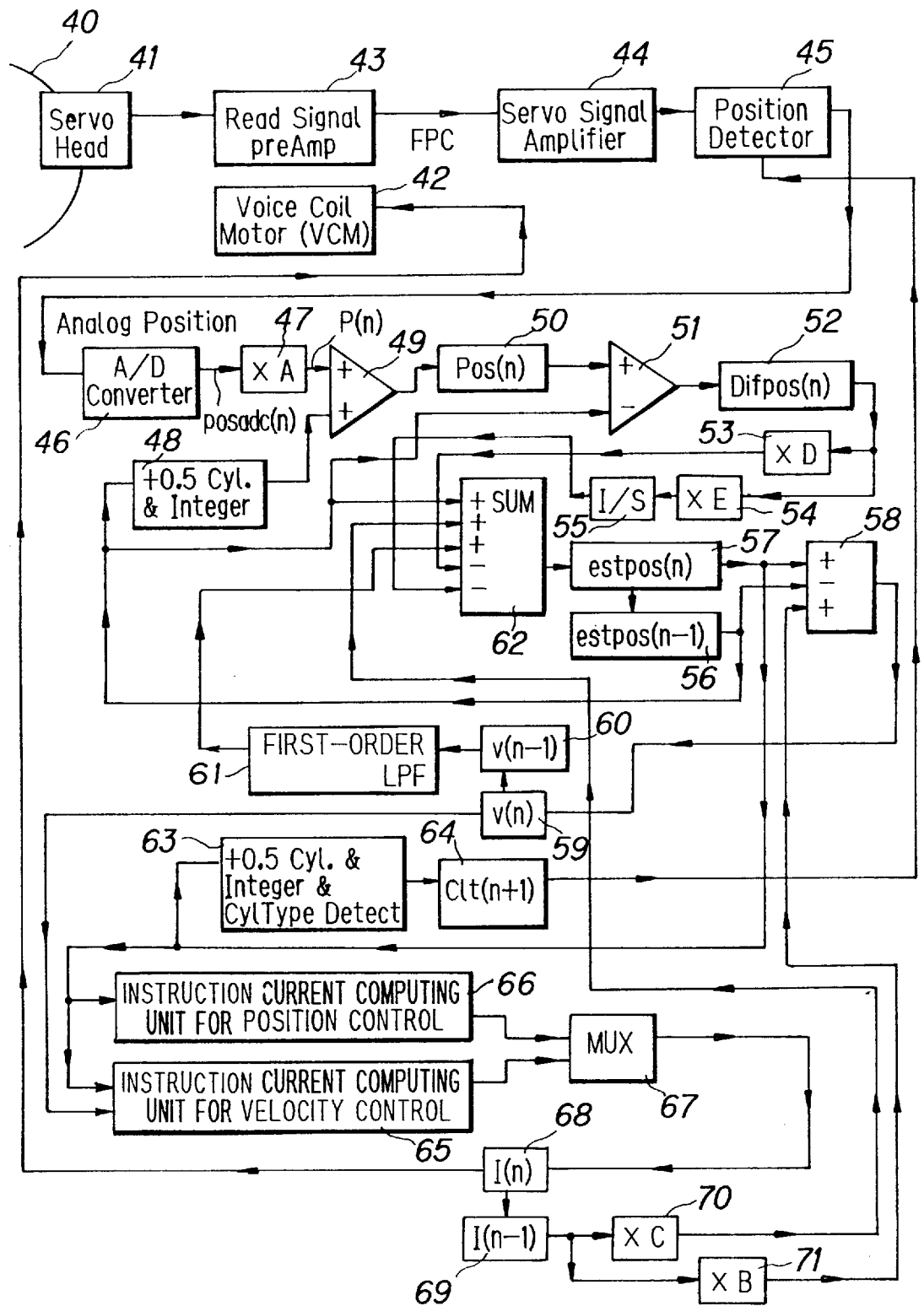
FIG. 2 is a block diagram illustrating the architecture of a head position control unit.

FIG. 2 is a block diagram illustrating the architecture of the unit for controlling the position of a head in a magnetic disk apparatus which embodies the present invention. The cylinders of the magnetic disk apparatus are successively assigned n types (four in this example) of different cylinder types CYL0~CYL3 (see FIG. 17). The n types of cylinder types are assigned every n cylinders.

A magnetic disk (servo disk) 40 has position detection marks recorded thereon. The servo disk 40 can be provided separately of a magnetic disk on which user information is recorded. Alternatively, user information can be recorded on one side of the disk and position detection marks can be recorded on the other side. The arrangement includes a servo head 41, a voice coil motor (VCM) 42 for moving the head in the radial direction, a preamplifier 43 for amplifying the signal read by the head, a servo signal amplifier 44 having an AGC function, a position demodulator 45 for demodulating the position deviation signal, which indicates the deviation of the head from the center of the cylinder to which the predicted position belongs, using the signal representing the position detection mark read by the servo head, an AD converter 46 for converting the position deviation signal to the digital value posadc(n), and a multiplier 47 for multiplying the digital value posadc(n) by A to effect a conversion to cylinder units p(n) [=A·posadc(n)].

Upon being provided with the signal representing the position detection mark read from the disk and the cylinder type clt(n) of the cylinder to which the predicted head position belongs, the position demodulator 45 uses these signals to generate a position deviation signal, which corresponds to the deviation from the center of the cylinder of this cylinder type to the head. The position deviation signal enters the AD converter 46. The principle for generation of the position deviation signal will be described later.

An integer calculating unit 48 performs the operation indicated by the formula $$\text{INT}[\text{estpos}(n-1)+0.5]$$

to output the integer part of a value obtained by adding 0.5 to the predicted position estpos(n−1) of the head, at the current sampling time t(n), that was predicted at the sampling time t(n−1). A head position calculating unit 49 uses the output of the multiplier 47 and the output of the integer calculating unit 48 to calculate the head position pos(n) at the current sampling time t(n) in accordance with the equation $$\text{pos}(n)=\text{INT}[\text{estpos}(n-1)+0.5]+p(n) \qquad (6)$$

A storage unit 50 stores the head position pos(n), and a prediction error calculating unit 51 for calculating and outputting the prediction error difpos(n), which is the difference between the current head present pos(n) and the estimated head position estpos(n−1) in accordance with the equation $$\text{difpos}(n)=\text{pos}(n)-\text{estpos}(n-1) \qquad (7)$$

A memory 52 stores the prediction error difpos(n).

A multiplier 53 multiplies the prediction error difpos(n) by a coefficient D, a multiplier 54 multiplies the prediction error difpos(n) by a coefficient E, and an integrating circuit 55 for integrating the output E·difpos(n) of the multiplier 54. Specifically, the integrating circuit 55 calculates the integrated value Intgr[E·difpos(n)] by summing E·difpos(n) outputted by the multiplier 54 every sampling time. Memories 56 and 57 store predicted positions estpos(n−1), estpos(n) estimated at the previous sampling time t(n−1) and current sampling time t(n), respectively. A velocity calculating unit 58 calculates head traveling velocity v(n) in accordance with the equation $$v(n)=\text{estpos}(n)-\text{estpos}(n-1)+B\times I(n-1) \qquad (8)$$

(where B is a coefficient) using the predicted positions estpos(n−1), estpos(n) predicted at the sampling times t(n−1), t(n), respectively, and the current command value I(n−1) at the sampling time t(n−1). A memory 59 stores the calculated head traveling velocity v(n), and a memory 60 stores the head traveling velocity v(n−1) calculated at the sampling time t(n−1). A first-order low-pass filter 61 mitigates sudden changes in velocity.

A predicted position calculating unit 62 calculates the head position at the next sampling time t(n+1). Specifically, the unit 62 calculates the predicted position estpos(n) in accordance with the equation $$\text{estpos}(n)=\text{estpos}(n-1)+C\cdot I(n-1)+f[v(n-1)]-D\cdot\text{difpos}(n)-\text{Intgr}[E\cdot\text{difpos}(n)] \qquad (9)$$

and stores estpos(n) in the memory 57. It should be noted that f( ) in the third term on the right side of Equation (9) signifies the output of the first-order low-pass filter.

The above-mentioned equation predicts the head position at the next sampling time by adding the output of the first-order low-pass filter f[v(n−1)], namely the head traveling velocity (the third term on the right side) to the predicted position estpos(n−1) (the first term on the right side) at the current sampling time predicted at the sampling time t(n−1), and corrects this predicted position by the prediction error D·difpos(n), the integrated value Intgr[E·difpos(n)] of the prediction error and the current command value C·I(n−1).

Thus, the output of the first-order low-pass filter, namely the head traveling velocity, is added to the predicted position estpos(n−1), whereby the predicted position estpos(n) at the next sampling time is obtained, and this predicted value is corrected based upon the prediction error D·difpos(n) (where D is a constant for deciding the rate at which the correction is performed). As a result, even if the surface of the medium is flawed, the predicted position will not significantly deviate from the head position and the head can be positioned at the target cylinder correctly. Further, since the predicted position is calculated using the velocity v(n−1) obtained from the low-pass filter, sudden changes in the frequency of the velocity signal can be mitigated and positioning of the head can be performed in stable fashion. Furthermore, the predicted position estpos(n) is corrected by the instructed current I(n−1) of the motor, namely by the acceleration of the motor. Accordingly, even if the calculated velocity v(n) develops a phase lag relative to the intrinsic velocity of the head, the phase lag can be corrected. The result of multiplying the predicted position error difpos(n), which is generated in steady fashion during a seek operation, by E (response rate of change) is integrated [Intgr(E×difpos(n)] and the predicted position is corrected by this integrated value. As a result, chronically occurring prediction error can be eliminated as it occurs.

A cylinder type calculating unit 63 calculates the cylinder type of the cylinder to which the predicted position belongs. Specifically, the unit 63 calculates cylinder type clt(n+1) in accordance with the equation $$\text{clt}(n+1)=\text{INT}[\text{estpos}(n)+0.5] \text{ AND } 3 \qquad (10)$$

where AND represents the logical product of corresponding bits and 3 is a binary number. A memory 64 stores the cylinder type clt(n+1). There are four cylinder types, namely CYL0, CYL1, CYL2 and CYL3 (see FIG. 17). Cylinder types 0, 1, 2, 3 are assigned cyclically in the radial direction from the inner cylinder of the disk to the outer cylinder of the disk. Accordingly, the cylinder positions of the cylinder types are expressed by 4n+0, 4n+1, 4n+2, 4n+3. In other words, when cylinder position is expressed by a binary number, the cylinder type of the cylinder is ascertained by the two lower order bits. Thus, Equation (10) obtains the logical product between corresponding bits of the result of obtaining the integral part of the predicted position and 00000 . . . 011 (the binary number 3) and calculates the cylinder type of the cylinder to which the predicted position belongs. The cylinder type clt(n+1) is used in the position modulator 45 when the latter modulates the position deviation signal indicating the deviation of the head from the center of the cylinder to which the predicted position estpos(n) belongs at the next sampling time t(n+1).

An instruction current computing unit 65 for velocity control calculates and outputs the command current value I(n) applied to the voice coil motor 42 when control (seek control) is performed to move the head to the target cylinder at a predetermined velocity. Specifically, the unit 65 outputs the command current value I(n) for velocity control using the predicted position estpos(n) predicted at the current sampling time t(n) and the head traveling velocity v(n).

An instruction current calculating unit 66 for position control calculates and outputs the command current value I(n) applied to the voice coil motor 42 after the head arrives at the target cylinder (i.e., after attainment of the on-track state). Specifically, the unit 66 outputs the command current value I(n) for positioning the head at the center of the target cylinder using the predicted position estpos(n) predicted at the current sampling time t(n).

Numeral 67 denotes a multiplexer. At the time of seek control, the multiplexer 67 selects and outputs the command current value I(n) which enters from the instruction current calculating unit 65 for velocity control. At the time of position control, the multiplexer 67 selects and outputs the command current value I(n) which enters from the instruction current calculating unit 66 for position control. A memory 68 stores the command current value I(n), and a memory 69 stores the command current value I(n−1) at the previous sampling time t(n−1). A multiplier 70 multiplies the command current value I(n−1) by the coefficient C, and a multiplier 71 multiplies the command current value I(n−1) by the coefficient B.

Whether the head has arrived at the target cylinder (whether the on-track state has been attained) is judged by comparing the head position pos(n) and the target cylinder position. The result of this determination enters the multiplexer, which proceeds to output the predetermined current command value I(n).

(C) Position detection marks

Position detection information for outputting the position deviation signal indicative of deviation from the center of the target track to the head is recorded on the servo disk.

Figure 3:
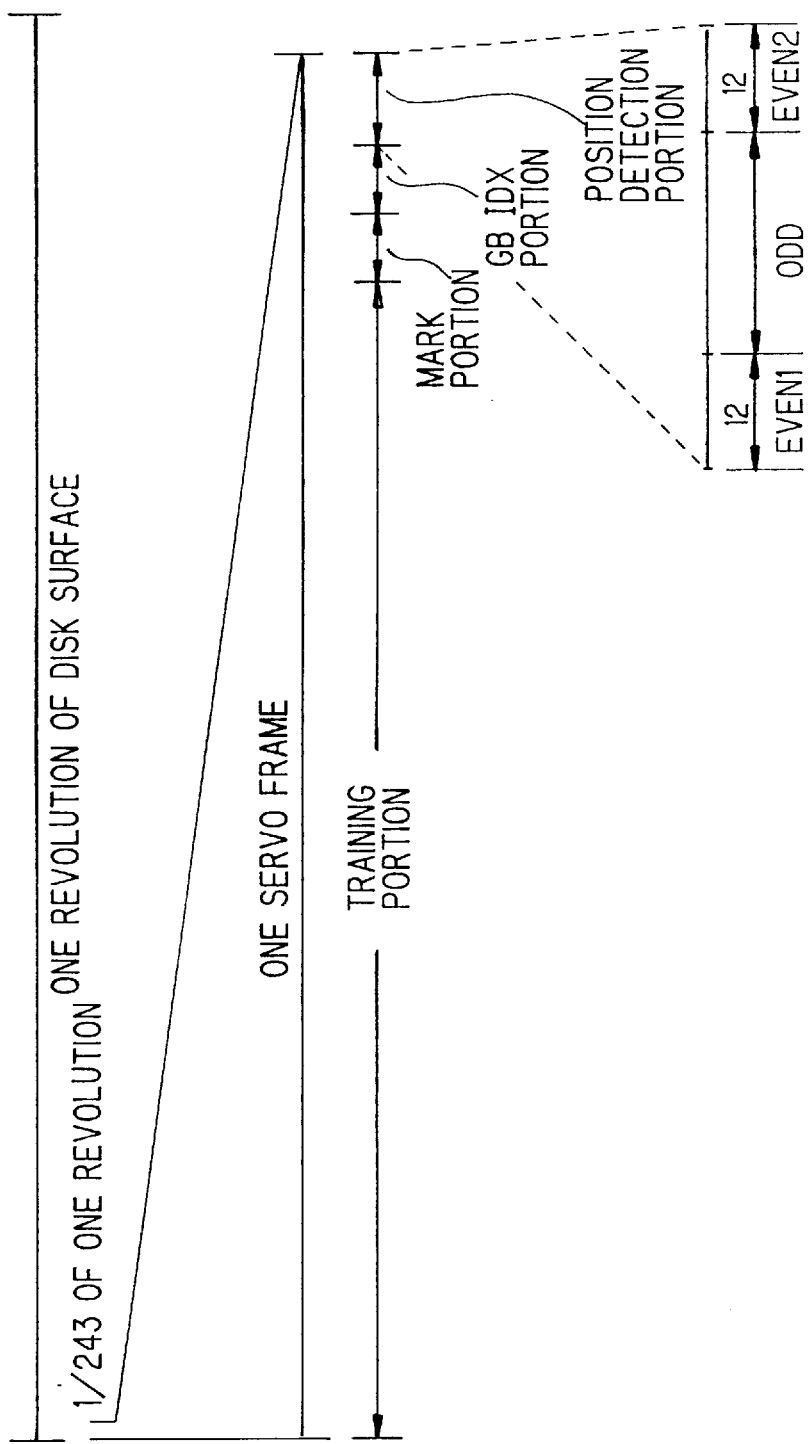
FIG. 3 is a diagram for describing a servo pattern.

FIG. 3 is a diagram for describing the servo pattern recorded on the disk track. One period of the servo pattern is constituted by a training pattern (training portion), marker portion (mark portion), guard band index portion (GB·IND portion) and position detection portion. The training pattern is for synchronizing the phase of the PLL, the marker portion is for establishing position in the servo pattern, and the position detection portion is for detecting head position. The position detecting portion has an EVEN1 area of 4T×12, an ODD area of 4T×20, and an EVEN2 area of 4T×12, where 4T represents the sampling period.

Figure 4:
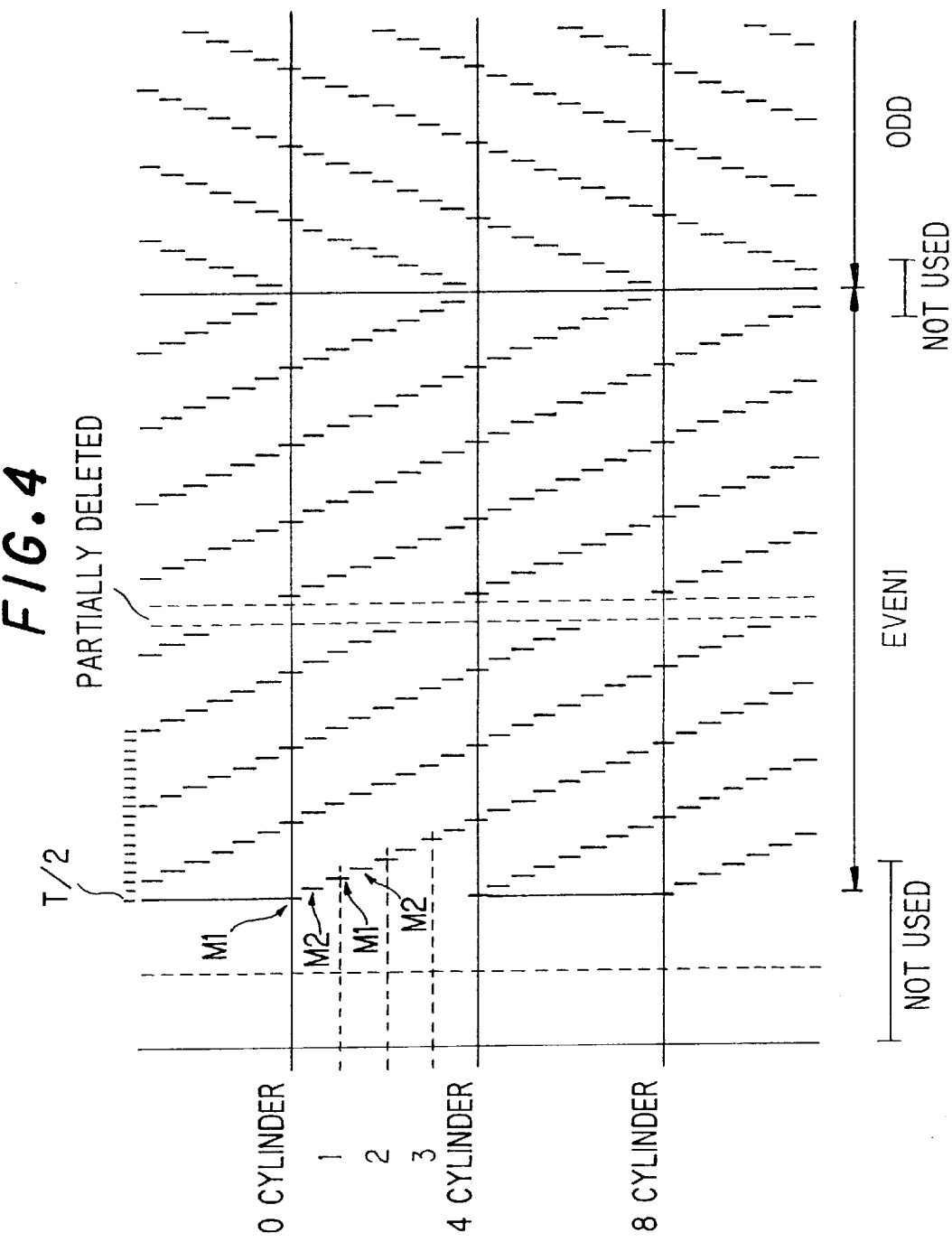
FIG. 4 is a diagram (part 1) for describing a position detection mark.
Figure 5:
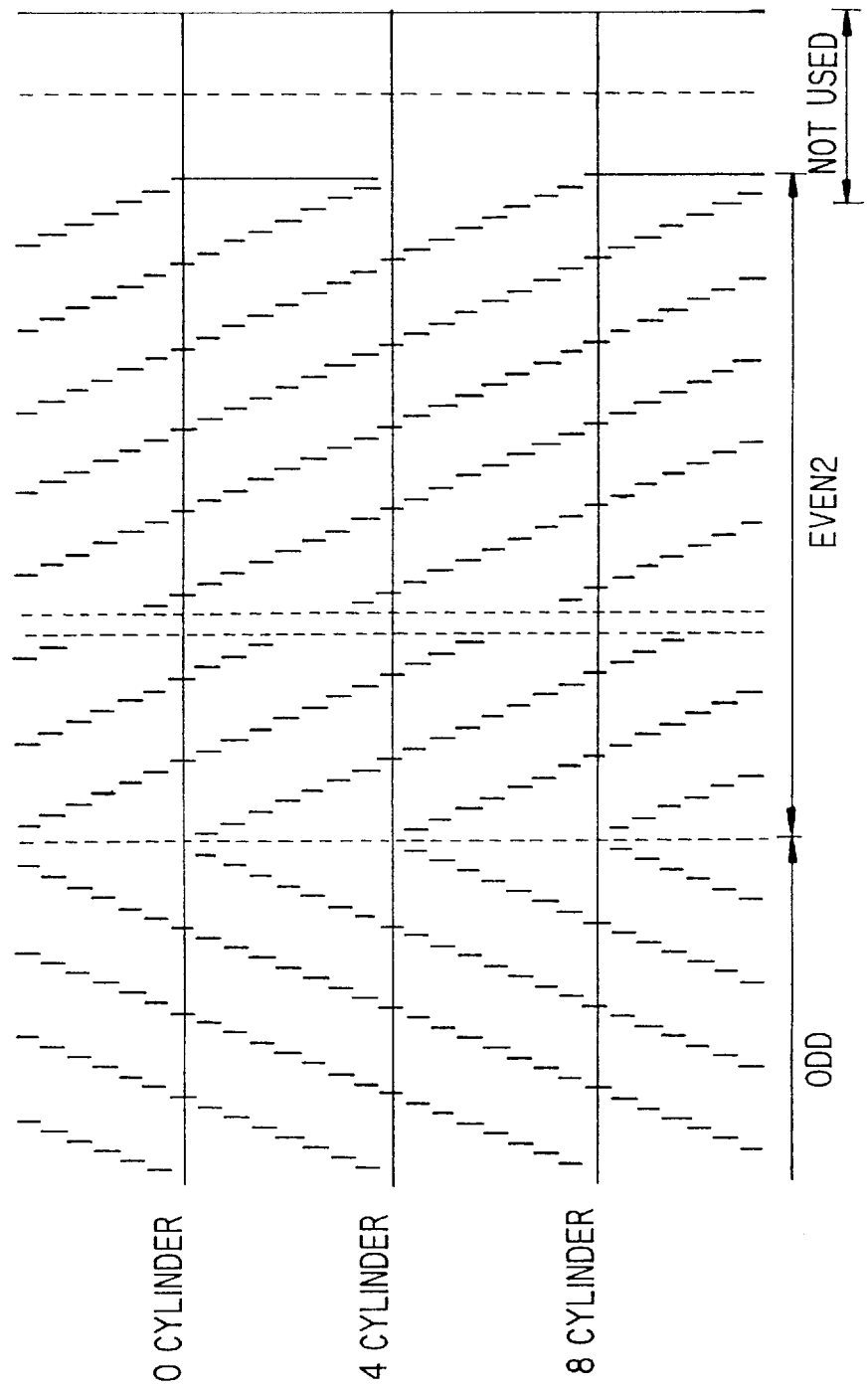
FIG. 5 is a diagram (part 2) for describing a position detection mark.

FIGS. 4 and 5 are diagrams for describing the position detection marks recorded in the position detection portion. A first position detection mark M1 is recorded on each cylinder (track) at a period of 4T, and a second position detection mark M2 is recorded on the each cylinder (track) at the period of 4T following a delay of T/2. The first and second position detection marks M1, M2 recorded on each cylinder are successively delayed by T/2 each from cylinder to cylinder so that the same pattern is recorded every four cylinders. The inclination of the marks in the EVEN1 and EVEN2 areas is opposite that in the ODD area.

(D) Principle of phase-type servo demodulation

FIGS. 6 through 12 are diagrams for describing the principle of phase-type servo demodulation, in which the bold lines PLL-CLK indicate the basic phase of the period 4T, HTR indicates the path of movement of the servo head and the solid diagonal lines indicate position detection marks (see FIGS. 4 and 5).

Figure 6:
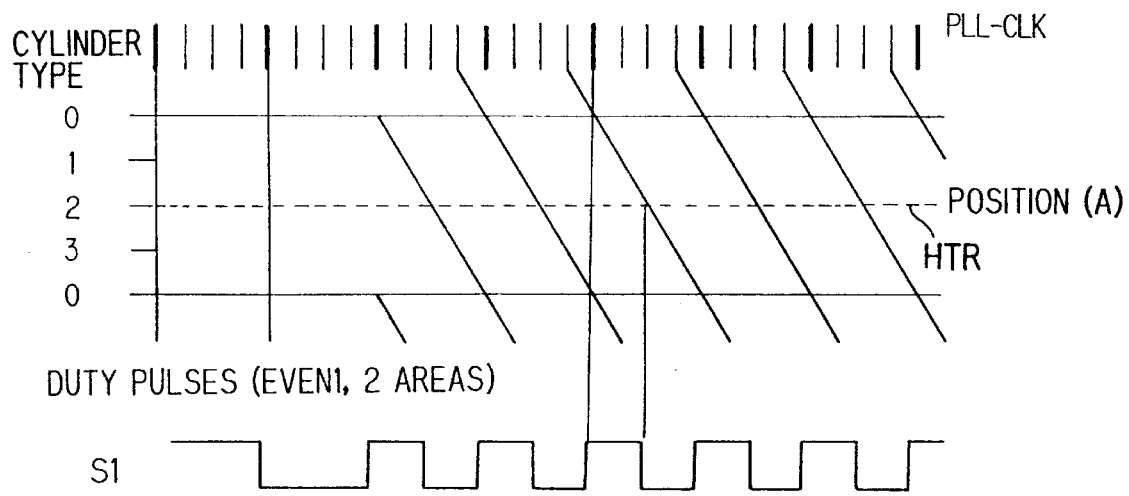
FIG. 6 is a diagram (part 1) for describing the principle of phase-type servo demodulation.
Figure 7:
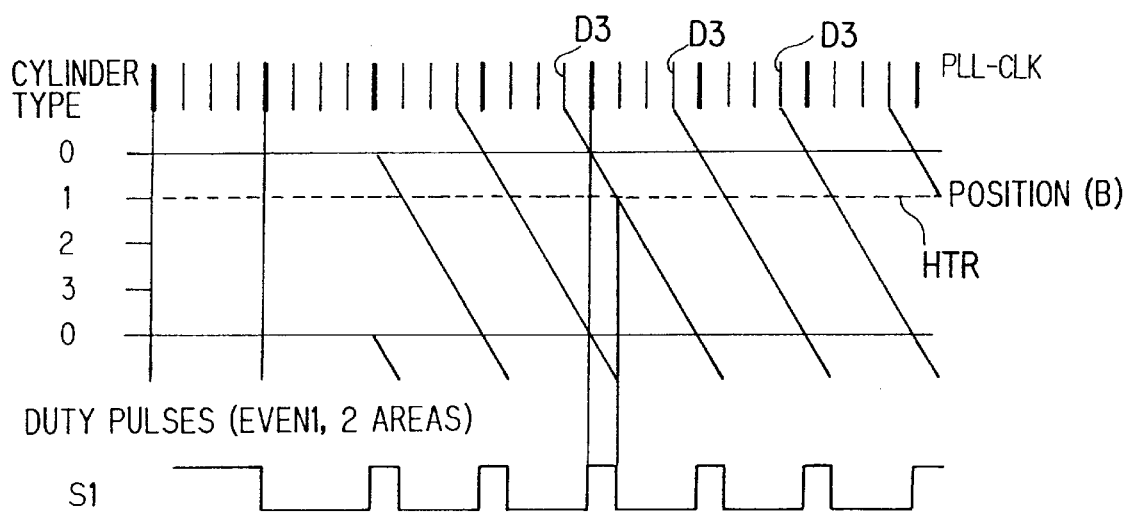
FIG. 7 is a diagram (part 2) for describing the principle of phase-type servo demodulation.
Figure 8:
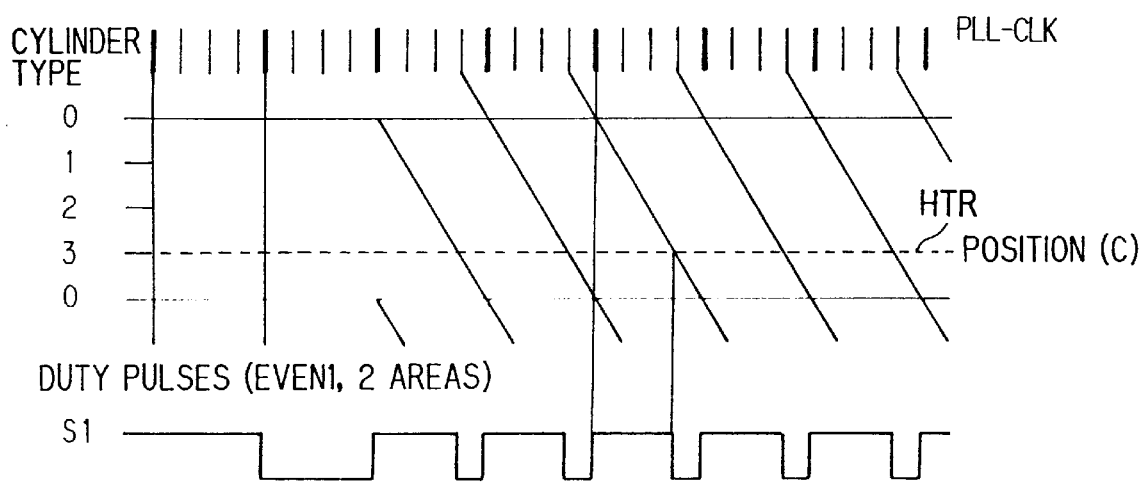
FIG. 8 is a diagram (part 3) for describing the principle of phase-type servo demodulation.

Assume that there is a signal S1 that is set by the basic phase of PLL-CLK and reset by a read signal representing the position detection marks of the servo medium surface in a case where the head is traveling on cylinder type 2. Under such an assumption, the waveform of the signal S1 will have a duty of 50% in the EVEN1, EVEN2 areas, as shown in FIG. 6. If the head is traveling on cylinder type 1, the signal S1 will have a duty of 25%, as shown in FIG. 7. If the head is traveling on cylinder type 3, the signal S1 will have a duty of 75%, as shown in FIG. 8. In other words, if the head is on track with respect to cylinder 2, the duty of signal S1 will be 50%. If the track moves to the smaller cylinder numbers, the duty becomes narrower. Conversely, if the track moves to the larger cylinder numbers, the duty becomes broader.

Figure 9:
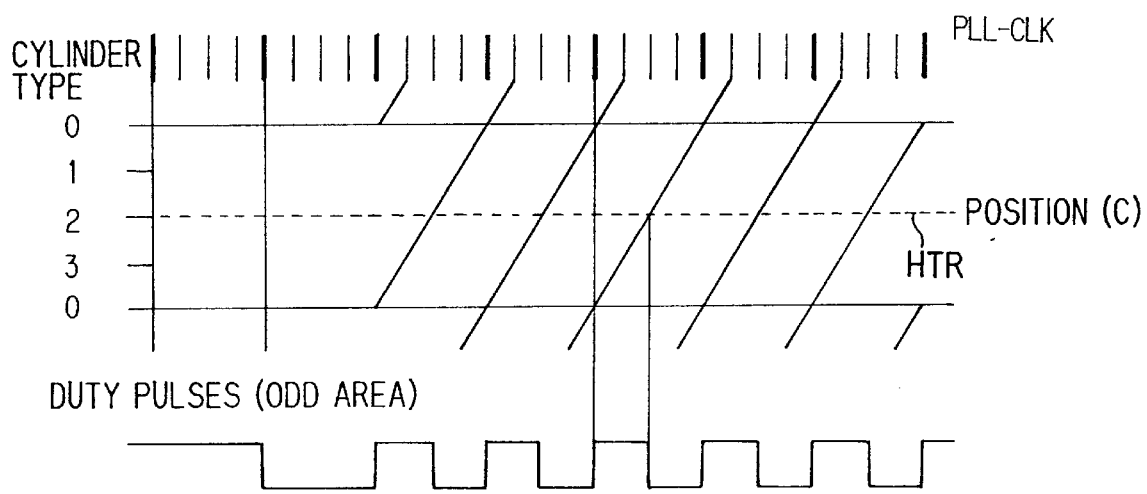
FIG. 9 is a diagram (part 4) for describing the principle of phase-type servo demodulation.

The foregoing is for a case where the signal S1 is reset following reading of the position detection marks written in EVEN1, 2 areas. However, in a case where the signal S1 is reset upon reading the position detection marks written in the ODD area, the signal S1 becomes as shown in FIG. 9.

If the head is moved toward the smaller cylinder numbers in the EVEN1, 2 areas, the duty becomes narrower. Conversely, if the head is moved toward the larger cylinder numbers in the EVEN1, 2 areas, the duty becomes broader. If the head is moved toward the smaller cylinder numbers in the ODD area, the duty becomes broader. Conversely, if the head is moved toward the larger cylinder numbers in the ODD area, the duty becomes narrower.

Figure 10:
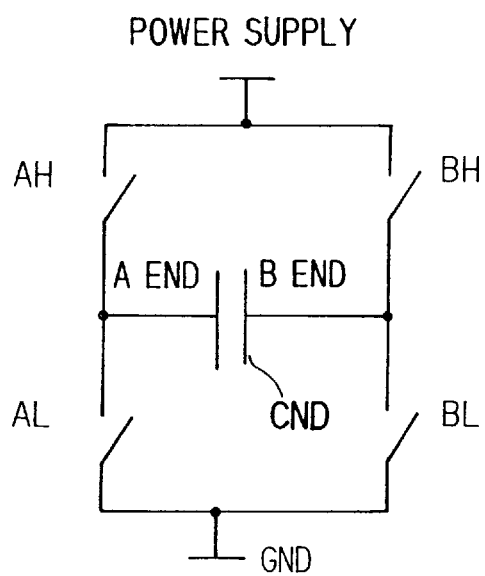
FIG. 10 shows the principle of a circuit for converting a duty pulse to voltage.
Figure 11:
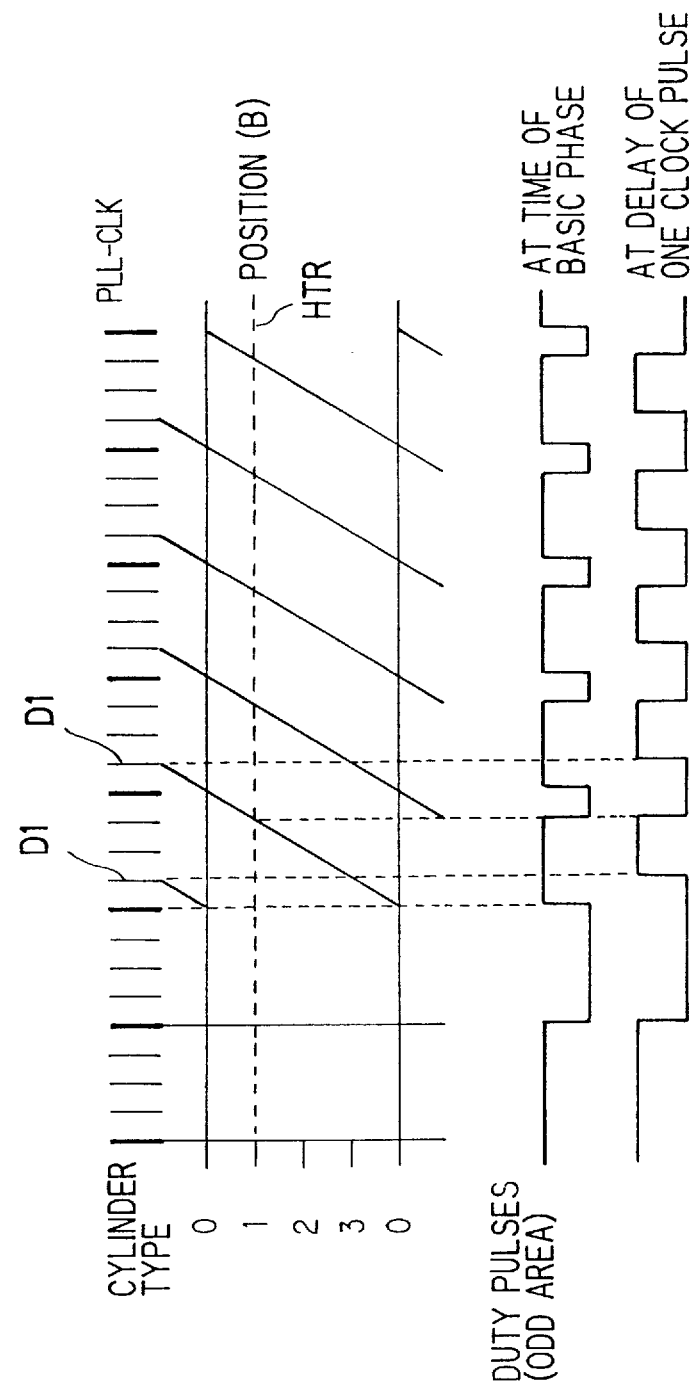
FIG. 11 is a diagram (part 5) for describing the principle of phase-type servo demodulation.

FIG. 10 shows the principle of a circuit for converting the above-mentioned duty pulses to voltage. The circuit includes switches AH, AL, BH, BL and a capacitor CND. In the areas EVEN1, EVEN2, the switch AH is always closed and the switch BL is opened/closed in accordance with the duty pulse (signal S1). When the switch BL is closed, a current flows from the A end to the B end of the capacitor CND so that the voltage at the A end rises from the viewpoint of the B end (the switches BH and AL are open and do not operate).

In the area ODD, the switch BH is always closed and the switch AL is opened/closed in accordance with the duty pulse. When the switch AL is closed, a current flows from the B end to the A end of the capacitor CND so that the voltage at the A end declines from the viewpoint of the B end (the switches AH and BL are open and do not operate).

Accordingly, when there is a change in voltage at such time that the servo head is being moved on position (A) in FIG. 6 (on the cylinder of type 2), a current flows from the A end to the B end at a duty of 50% in area EVEN1, from the B end to the A end at a duty of 50% in the ODD area, and finally from the A end to the B end at a duty of 50% in the EVEN2 area. Since the length of integration time of the ODD area is equal to the sum of the lengths of the integration time of the areas EVEN1 and EVEN2, the voltages at the A and B ends eventually become equal. This is the on-track state.

When there is a change in voltage at such time that the servo head is being moved on position (B) in FIG. 7 (on the cylinder of type 1), a current flows from the A end to the B end at a duty of 25% in area EVEN1, from the B end to the A end at a duty of 75% in the ODD area, and finally from the A end to the B end at a duty of 25% in the EVEN2 area. Consequently, the current that has flowed from the B end to the A end is larger than the current that has flowed from the A end to the B end, as a result of which the voltage at the A end falls from the viewpoint of the B end. Similarly, when a change in voltage at such time that the servo head is being moved on position (C) in FIG. 8 (on the cylinder of type 3) is considered, the voltage at the A end rises when viewed from the B end.

As a result of the foregoing, the capacitor voltage prevailing after the head has traversed the areas EVEN1, ODD, EVEN2 is a voltage proportional to the position deviation from the cylinder type 2 to the head. Accordingly, by controlling position in such a manner that the position deviation signal becomes zero, the head can be positioned at the cylinder of type 2. However, this will not enable the head to be positioned at the cylinders of the other types.

In order to bring the head to the on-track state with respect to the cylinder positions of any of the cylinder types 0, 1, 2, 3, the phase of PLL-CLK need only be selected in such a manner that the duty of the signal S1 will be 50% at each cylinder position.

The duty ratio is 25% at position (B) (cylinder 1, EVEN1, 2 areas) in FIG. 7. If the signal S1 is set at clock D3, which is one clock pulse earlier than the basic phase of PLL-CLK, and is reset at the read signal of the servo medium surface, the duty of the signal S1 becomes 50%, which corresponds to the on-track state. Similarly, the duty ratio is 75% at position (B) (cylinder 1, ODD area) in FIG. 11. If the signal S1 is set at clock D1, which is one clock pulse later than the basic phase of PLL-CLK, and is reset at the read signal of the servo medium surface, the duty of the signal S1 becomes 50%, which corresponds to the on-track state.

Accordingly, if the signal that turns on the duty pulse S1 is selected from the four phases of PLL-CLK in dependence upon the whether area in which (1) the cylinder type of the target cylinder and (2) the position detection mark are read is the EVEN area or ODD area, it is possible to achieve the on-track state using the same integrating circuit.

FIG. 12 illustrates the timing of cylinder changeover necessary to achieve the on-track state with regard to the cylinder types 0, 1, 2, and 3. In FIG. 12, PLL-CK4-D0 is the basic phase of 4T indicated by the bold lines in each drawing. The clocks which are one, two and three clocks later in phase are PLL-CD4-D1, PLL-CD4-D2 and PLL-CD4-D3. The clocks three pulses later than and one pulse earlier than PLL-CK4-D0 are equivalent. This is PLL-CK-D3. The clock selected in accordance with FIG. 12 is referred to as a master clock. More specifically, the duty pulse S1 is set by the master clock and reset by the read pulse of the servo medium surface.

As should be obvious from the corresponding relationships between the cylinder and master clock shown in FIG. 12, the clock when the head is on-track on cylinder type 2 in FIG. 6 (the EVEN area) is PLL-CK4-D0, and the clock when the head is on-track on cylinder type 2 in FIG. 9 (the ODD area) is PLL-CK4-D0. Further, if the head is on-track on cylinder type 1, PLL-CK4-D3, which is a clock one earlier than PLL-CK4-D0 (the basic phase of PLL-CLK) is used in the EVEN area. In the ODD area, PLL-CK4-D1, which is a clock one later than PLL-CK4-D0, is used. As a result, the on-track state is attainable through the same integration method as that for the cylinder type 2.

(E) Overall control operation

Figure 13:
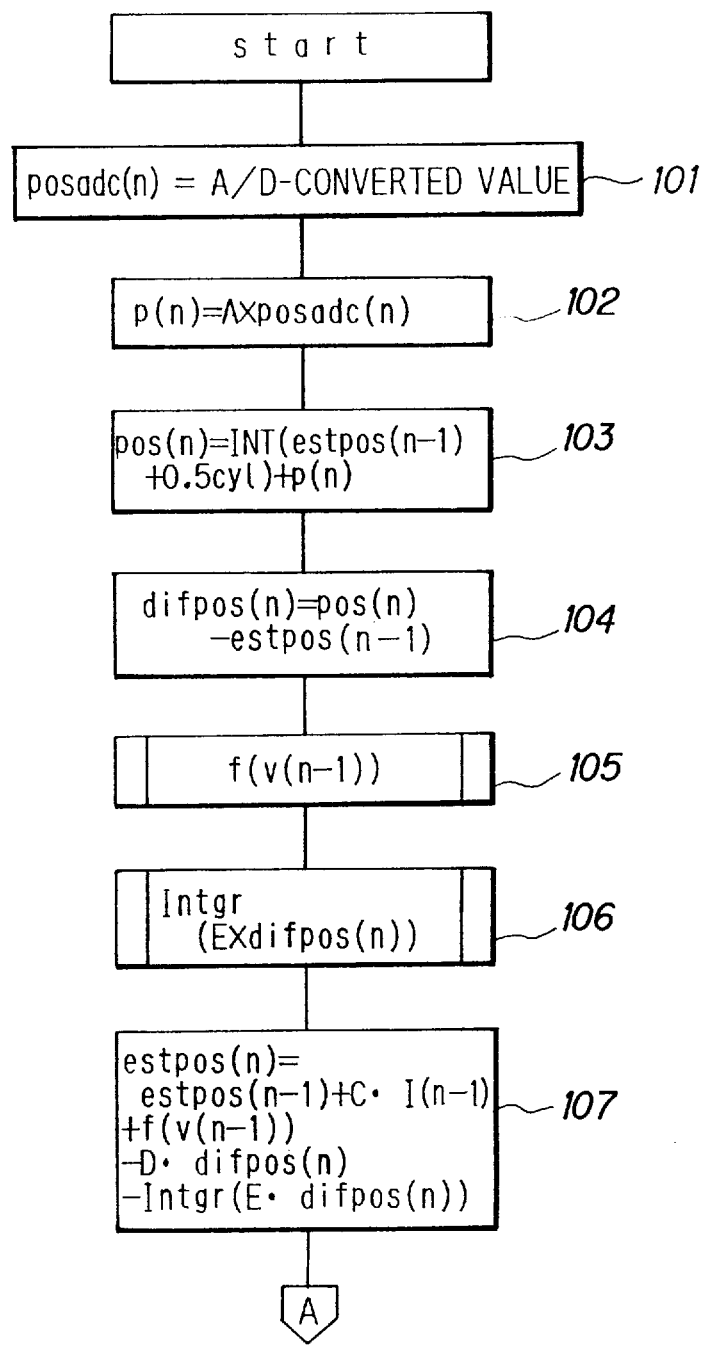
FIG. 13 is a flowchart (part 1) of processing for controlling head position according to the present invention.
Figure 14:
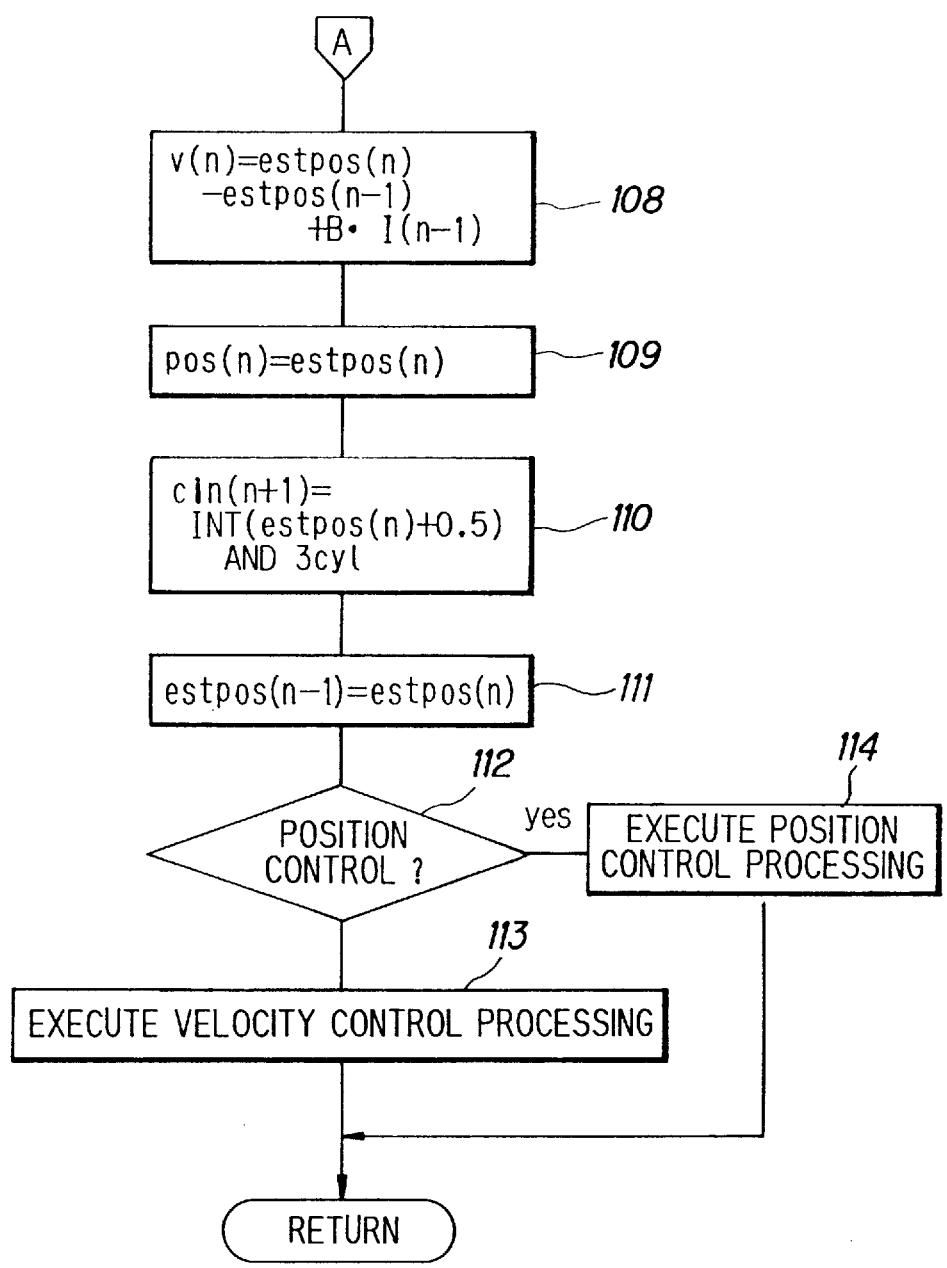
FIG. 14 is a flowchart (part 2) of processing for controlling head position according to the present invention.

FIGS. 13 and 14 are flowcharts of processing for controlling head position according to the present invention.

When a servo interrupt is generated by reading a servo mark on the disk, the position demodulator 45 outputs the position deviation signal, which indicates the deviation of the head from the center of the cylinder to which the predicted head position estpos(n−1) at the current sampling time t(n), and the AD converter 46 converts the position deviation signal to the digital value posadc(n) (step 101). The multiplier 47 multiplies the digital value posadc(n) by A to effect a conversion to cylinder units p(n) [=A·posadc (n)], the integer calculating unit 48 performs the operation indicated by the formula $$\text{INT}[\text{estpos}(n-1)+0.5]$$

to output the integer part of a value obtained by adding 0.5 to the predicted position estpos(n−1) of the head at the current sampling time t(n) (step 102.).

The head position calculating unit 49 uses the output of the multiplier 47 and the output of the integer calculating unit 48 to calculate the head position pos(n) at the current sampling time t(n) in accordance with the equation $$\text{pos}(n)=\text{INT}[\text{estpos}(n-1)+0.5]+p(n)$$

and stores the head position pos(n) in the memory 50 (step 103). Next, the prediction error calculating unit 51 calculates the prediction error difpos(n), which is the difference between the current head position pos(n) and the estimated head position estpos(n−1) in accordance with the equation $$\text{difpos}(n)=\text{pos}(n)-\text{estpos}(n-1)$$

and stores the prediction error difpos(n) in the memory 52 (step 104).

The low-pass filter 61 subjects the head traveling velocity v(n−1) to first-order low-pass filtering processing and outputs the result f[v(n−1)] of processing (step 105). The integrating circuit 55 calculates and outputs the integrated value Intgr[E·difpos(n)] by summing E·difpos(n) outputted by the multiplier 54 every sampling time (step 106).

Next, the predicted position calculating unit 62 calculates the predicted head position estpos(n) at the next sampling time t(n+1) in accordance with the equation $$\text{estpos}(n)=\text{estpos}(n-1)+C\cdot I(n-1)+f[v(n-1)]-D\cdot\text{difpos}(n)-\text{Intgr}[E\cdot\text{difpos}(n)]$$

and stores estpos(n) in the memory 57 (step 107). The above-mentioned equation predicts the head position at the next sampling time by adding the output of the first-order low-pass filter f[v(n−1)], namely the head traveling velocity (the third term on the right side) to the predicted position estpos(n−1) (the first term on the right side) at the current sampling time predicted at the sampling time t(n−1), and corrects this predicted position by the prediction error D·difpos(n), the integrated value Intgr[E·difpos(n)] of the prediction error and the current command value C·I(n−1).

If the predicted head position estpos(n) at the next sampling time t(n+1) is obtained, the velocity calculating unit 58 calculates head traveling velocity v(n) in accordance with the equation $$v(n)=\text{estpos}(n)-\text{estpos}(n-1)+B\times I(n-1)$$

(where B is a coefficient) using the predicted positions estpos(n−1), estpos(n) predicted at the sampling times t(n−1), t(n), respectively, and the current command value I(n−1) at the sampling time t(n−1), and stores v(n) in the memory 59 (step 108). Thereafter, the predicted position estpos(n) is regarded as the head position p(n) (step 109).

The cylinder type calculating unit 63 calculates the cylinder type of the cylinder at which the predicted position estpos(n) is situated in accordance with the equation $$\text{clt}(n+1)=\text{INT}[\text{estpos}(n)+0.5]\text{ AND }3$$

(where AND represents the logical product of corresponding bits and 3 is a binary number) and enters the cylinder type clt(n+1) in the position demodulator 45 in preparation for the next sampling time (step 110).

Thereafter, the predicted position estpos(n) is adopted as estpos(n−1) (step 111). It is then determined whether the head position is on-track or not (step 112). If the on-track state has not been attained, then the instruction current computing unit 65 for velocity control outputs the command current value I(n) for velocity control using the head position pos(n) [=predicted position estpos(n)] at the current sampling time t(n) and the head traveling velocity v(n), thereby driving the voice coil motor 42 and moving the head to the target cylinder while controlling the velocity thereof (step 113). If the on-track state has been attained, however, the instruction current calculating unit 66 for position control outputs the command current value I(n), which is for positioning the head at the center of the target cylinder, using the head position pos(n) [=predicted position estpos(n)], thereby driving the voice coil motor 42 and moving the head to the center of the target cylinder while controlling the position thereof (step 114).

The above-described is repeated until the head arrives at the target position.

Figure 15:
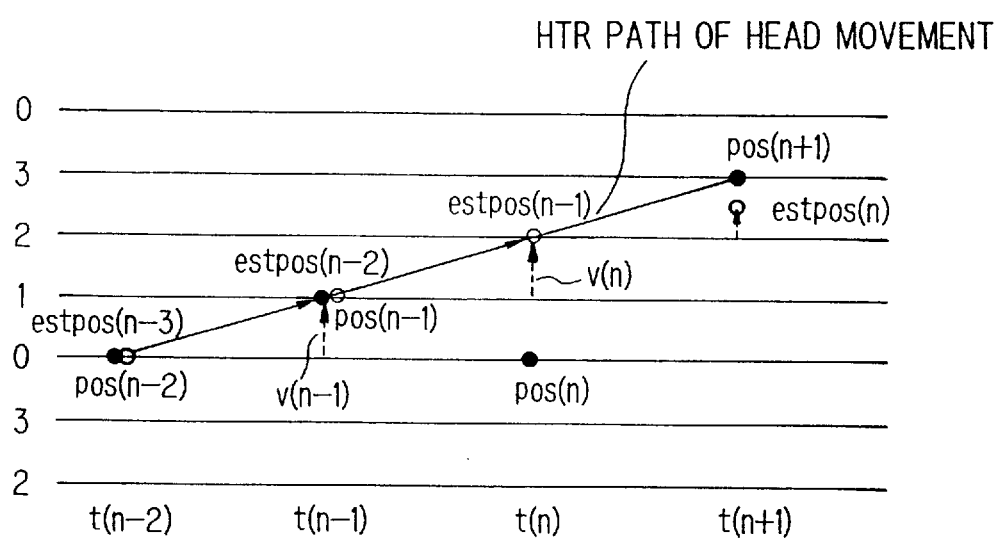
FIG. 15 is a diagram for describing the effects of the present invention.
Figure 16:
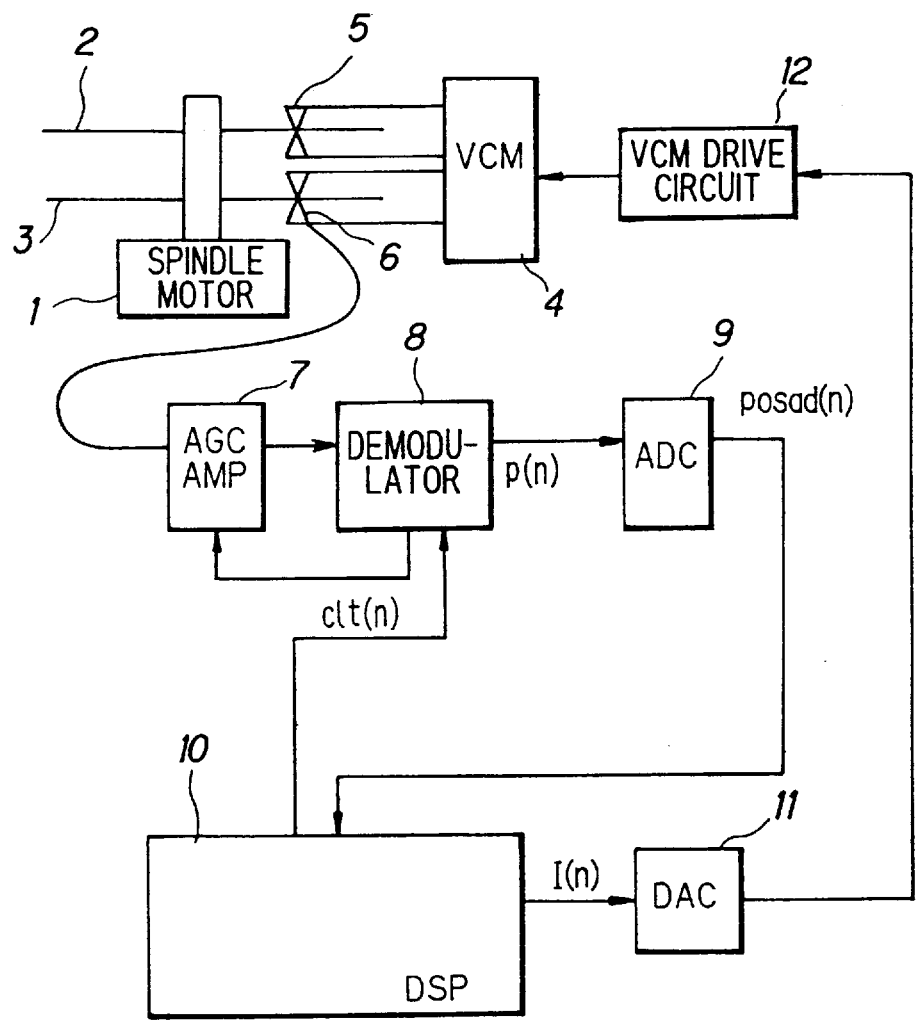
FIG. 16 is a block diagram showing a servo circuit according to the prior art.

Thus, the output of the first-order low-pass filter, namely the head traveling velocity v(n−1), is added to the predicted position estpos(n−1), at the current sampling time t(n), that was predicted at the sampling time t(n−1), whereby head position at the next sampling time is predicted. Moreover, this predicted position is corrected based upon the prediction error D·difpos(n), the integrated value Intgr[E·difpos(n)] of the prediction error and the current command value C·I(n−1). As a result, even if the surface of the medium is flawed, the predicted position will not significantly deviate from the head position and the head can be positioned at the target cylinder correctly. FIG. 15 is a diagram for describing such a point, for a case where D=¼ holds. Even if erroneous position information (position deviation signal) occurs at sampling time t(n) owing to a flawed medium and the position pos(n) deviates from the predicted position estpos (n−1), the error between the predicted position estpos(n) and the head position pos(n+1) can be held to one-fourth of the prediction error difpos(n), as illustrated in FIG. 15, if correct position information pos(n+1) is obtained at the next sampling time t(n+1). The head can thenceforth be positioned on the target cylinder correctly.

Further, since the predicted position is calculated using the velocity v(n−1) output of the low-pass filter, sudden frequency changes in velocity can be mitigated and stable control for positioning the head can be achieved.

Furthermore, the predicted position estpos(n) is corrected by the instructed current I(n−1) of the motor. Accordingly, even if the calculated velocity v(n) develops a phase lag relative to the intrinsic velocity of the head, the phase lag can be corrected.

Further, since the predicted position estpos(n) is corrected by the integrated value [Intgr(E×difpos(n)] of the prediction error, chronically occurring prediction error can be eliminated as it occurs.

The control described above can be applied to seek control, which is for moving the head from the current position to the target cylinder, and to control for positioning after the head has reached the target cylinder (i.e., after the head has been placed on track). In other words, the instruction current computing unit 65 for velocity control decides a current value instructed for the motor on the basis of the traveling velocity v(n) and predicted position estpos(n) until the head arrives at the target cylinder (i.e., at the time of seek control). The current value is applied to the motor. The instruction current calculating unit 66 for position control decides a current value instructed for the motor on the basis of the predicted position data estpos(n) after the head arrives at the target cylinder (i.e., after attainment of the on-track state). In this case, when position control following attainment of the on-track state is performed, the predicted position estpos(n) is calculated regarding the current value I(n−1) as being zero, thereby making it possible to hasten calculation speed.

A case has been described in which the present invention is applied to a servo-surface servo scheme. However, the invention can also be applied to a sector servo (data-surface servo scheme) in which the tracks on the disk are divided into a plurality of sectors, information for head position detection is written in each sector at a predetermined position thereof and data are written at the remaining portion of each sector.

The head position control apparatus in FIG. 2 has been described in a form divided into blocks in accordance with the control functions. However, the apparatus can be realized using a DSP (digital signal processor) or MPU (microprocessor unit).

Though a case has been described in which the present invention is applied to a magnetic disk apparatus, the invention is applicable to other disk apparatuses as well.

(F) Effects of the invention

In accordance with the present invention, the output of the first-order low-pass filter, namely the head traveling velocity v(n−1), is added to the predicted position estpos(n−1), at the current sampling time t(n), that was predicted at the sampling time t(n−1), whereby head position at the next sampling time is predicted. Moreover, this predicted position is corrected based upon the prediction error D·difpos(n), the integrated value Intgr[E·difpos(n)] of the prediction error and the current command value C·I(n−1). As a result, even if the surface of the medium is flawed or the carriage vibrate, the predicted position will not significantly deviate from the head position and the head can be positioned at the target cylinder correctly.

Further, in accordance with the invention, the predicted position is calculated using the velocity v(n−1) output of the low-pass filter. As a result, sudden frequency changes in velocity can be mitigated and stable control for positioning the head can be achieved.

Furthermore, in accordance with the present invention, the predicted position estpos(n) is corrected by the instructed current I(n−1) of the motor. Accordingly, even if the calculated velocity v(n) develops a phase lag relative to the intrinsic velocity of the head, the phase lag can be corrected.

Further, in accordance with the invention, the predicted position estpos(n) is corrected by the integrated value [Intgr (E×difpos(n)] of the prediction error. As a result, chronically occurring prediction error can be eliminated as it occurs.

As many apparently widely different embodiments of the present invention can be made without departing from the spirit and scope thereof, it is to be understood that the invention is not limited to the specific embodiments thereof except as defined in the appended claims.

What is claimed is:

1. A method of demodulating head position in a disk apparatus in which a position detection signal has been recorded on a disk medium, the position detection signal is sampled and a head is moved toward a target cylinder using the position detection signal sampled, comprising the steps of:

predicting, at a current sampling point, the position of the head at a next sampling point;

moving the head by providing a current for a motor based upon the predicted position at said next sampling point;

obtaining a position deviation, which indicates deviation from said predicted position to the head position, at said next sampling point by reading the position detection signal that has been recorded on the disk medium;

demodulating the head position at said next sampling point using said position deviation signal and said predicted position at said next sampling point;

adopting a difference between predicted positions at said current sampling point and said next sampling point as a traveling velocity, and predicting a position of the head at an immediately following sampling point using a value obtained by outputting said traveling velocity via a first-order low-pass filter, said predicted position at said next sampling point, a difference (prediction error) between said predicted position at said next sampling point and said head position at said next sampling point, and a value of the current provided for the motor; and providing a current for the motor based upon said predicted position at said immediately following sampling point.

2. The method according to claim 1, further comprising a step of correcting said traveling velocity based upon the provided current value.

3. The method according to claim 1, further comprising steps of determining a first current value provided for the motor based upon said traveling velocity and said predicted position at said immediately following sampling point until the head arrives at the target cylinder, determining a second current value provided for the motor based upon said predicted position at said immediately following sampling point after the head arrives at the target cylinder, and designating said first and second current values for the motor.

4. The method according to claim 1, wherein the current value is regarded as being zero when the head position is predicted after the head has arrived at the target cylinder.

5. The method according to claim 1, wherein said position detection signal is recorded on a disk surface different from the disk surface on which user information is recorded.

6. The method according to claim 1, wherein said position detection signal is recorded in a servo area on a disk having the servo area and a data area for every sector.

7. A method of demodulating head position in a disk apparatus in which a position detection signal has been recorded on a disk medium and a head is moved toward a target cylinder using said position detection signal, comprising the steps of:

successively assigning different cylinder types to each cylinder and assigning n kinds of cylinder types in similar fashion every n cylinders;

predicting, at a current sampling point t(n), head position estpos(n) at the next sampling point t(n+1);

obtaining a cylinder type clt(n+1) of a cylinder at which said predicted position estpos(n) resides, and moving the head upon providing a current for a motor based upon said predicted position estpos(n);

obtaining a position deviation, which indicates deviation from a center of the cylinder of said cylinder type clt(n+1) to the head, at the next sampling point t(n+1) by reading the position detection signal that has been recorded on the disk medium;

demodulating the head position pos(n+1) at said next sampling point t(n+1) using said position deviation signal and said predicted position estpos(n);

adopting a difference between predicted positions estpos(n) and a estpos(n−1) at a current sampling point as a traveling velocity and predicting a position of the head at an immediately following sampling point using a value obtained by outputting said traveling velocity via a first-order low-pass filter, said predicted position estpos(n), a difference (prediction error) between said predicted position estpos(n) and said head position pos(n+1) and a value of the current provided for the motor; and obtaining a cylinder type of a cylinder at which said predicted position at said immediately following sampling point resides and providing a current for the motor based upon said predicted position at said immediately following sampling point.

8. The method according to claim 7, further comprising a step of correcting said traveling velocity based upon the current value provided for the motor.

9. The method according to claim 7, further comprising steps of determining the current value provided for the motor based upon said traveling velocity and said predicted position at said immediately following sample point until the head arrives at the target cylinder, and determining the current value provided for the motor based upon said predicted position at said following sample point after the head arrives at the target cylinder.

* * * * *